(12) United States Patent
Zhang et al.

(10) Patent No.: US 9,749,903 B2
(45) Date of Patent: Aug. 29, 2017

(54) METHOD, SYSTEM, AND DEVICE FOR SWITCHING

(71) Applicant: China Academy of Telecommunications Technology, Beijing (CN)

(72) Inventors: Dajun Zhang, Beijing (CN); Wei Bao, Beijing (CN); Jing Liang, Beijing (CN); Yi Yang, Beijing (CN); Yali Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 19 days.

(21) Appl. No.: 14/583,208

(22) Filed: Dec. 26, 2014

(65) Prior Publication Data

US 2015/0139192 A1 May 21, 2015

Related U.S. Application Data

(63) Continuation of application No. PCT/CN2013/078301, filed on Jun. 28, 2013.

(30) Foreign Application Priority Data

Jun. 28, 2012 (CN) .......................... 2012 1 0224340

(51) Int. Cl.
*H04W 4/00* (2009.01)
*H04W 36/00* (2009.01)
(Continued)

(52) U.S. Cl.
CPC ........ *H04W 36/0011* (2013.01); *H04W 36/04* (2013.01); *H04W 36/0055* (2013.01); *H04W 36/14* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2008/0188223 | A1 | 8/2008 | Vesterinen et al. |
| 2009/0086676 | A1 | 4/2009 | Meylan et al. |

(Continued)

FOREIGN PATENT DOCUMENTS

| | | | |
|---|---|---|---|
| CN | 101810031 | A | 8/2010 |
| CN | 101841852 | A | 9/2010 |

(Continued)

OTHER PUBLICATIONS

The Extended European Search Report issued on Aug. 10, 2015 in the EP counterpart application (13810870.9).
International Search Report for PCT/CN2013/078301.

*Primary Examiner* — Nicholas Sloms
(74) *Attorney, Agent, or Firm* — Kilpatrick Townsend & Stockton LLP

(57) ABSTRACT

Embodiments of the present invention relate to the technical field of wireless communications, and specifically relate to a method, system and device for switching, for use in solving the problem in the prior art of the risk of communication interruption when a user equipment (UE) is switching due to greatly increased frequency and number of times of switching by the UE in an E-UTRAN network architecture. The method of the embodiments of the present invention comprises: a UE receives a DRB reconfiguration message from a macro base station; and the UE keeps a PDCP layer corresponding to all of the DRBs of a control side and of a user side at the macro base station, and switches other layers corresponding to some or all of the DRBs of the user side except the PDCP layer onto at least one base station. Because the embodiments of the present invention reduce the number of times of control side switching by the UE, in (Continued)

the case of increased frequency and number of times of switching by the UE in the E-UTRAN network architecture, the risk of communication interruption is reduced when the UE is switching.

15 Claims, 9 Drawing Sheets

(51) Int. Cl.
*H04W 36/04* (2009.01)
*H04W 36/14* (2009.01)
*H04W 84/04* (2009.01)

(56) References Cited

U.S. PATENT DOCUMENTS

| 2009/0149189 | A1 | 6/2009 | Sammour et al. | |
|---|---|---|---|---|
| 2009/0316664 | A1* | 12/2009 | Wu | H04W 76/028 370/336 |
| 2013/0137469 | A1* | 5/2013 | Schmidt | H04W 74/006 455/466 |
| 2014/0349659 | A1* | 11/2014 | Ishii | H04W 8/082 455/444 |

FOREIGN PATENT DOCUMENTS

| CN | 102348244 A | 2/2012 |
|---|---|---|
| CN | 102469577 A | 5/2012 |

* cited by examiner

--Prior Art--

--Prior Art--

--Prior Art--

--Prior Art--

METHOD, SYSTEM, AND DEVICE FOR SWITCHING

This application claims priority to and is a U.S. continuation application of International Application No. PCT/CN2013/078301, filed 28 Jun. 2013, which claims the priority to Chinese Patent Application No. 201210224340.3, filed with the Chinese Patent Office on Jun. 28, 2012 and entitled "Method, system and apparatus for switching", the content of which is hereby incorporated by reference in its entirety.

FIELD OF THE INVENTION

The present invention relates to the field of wireless communications and particularly to a method, a system, and a device for switching.

BACKGROUND OF THE INVENTION

As illustrated in FIG. 1 which is a schematic diagram of a network architecture of an Evolved Universal Terrestrial Radio Access Network (E-UTRAN), the E-UTRAN is composed of evolved Node Bs (eNBs).

A Mobility Management Entity (MME) and an eNB are connected via an S1-MME interface; and the eNB achieves the network access function and communicates with a User Equipment (UE) via an air interface. For each UE attached to the network, there is an MME serving the UE, and the MME is referred to as a serving MME of the UE. The S1-MME interface provides the UE with a control plane service, including mobility management and bearer management functions.

A Serving Gateway (S-GW) and the eNB is connected via an S1-U interface, and for each UE attached to the network, there is an S-GW serving the UE, where the S-GW is referred to as a serving S-GW of the UE. The S1-U interface provides the UE with a user plane service, and user plane data of the UE is transmitted between the S-GW and the eNB over a S1-U General Packet Radio Service (GPRS) Tunneling Protocol (GTP) bearer.

FIG. 2 illustrates a user plane protocol stack between the UE and the network, and FIG. 3 illustrates a control plane protocol stack, where user plane protocols include Packet Data Convergence Protocol (PDCP), Radio Link Control (RLC), Medium Access Control (MAC) and physical layer (PHY); and control plane protocols include Radio Resource Control (RRC) and Non-Access Stratum (NAS) layer, where an RRC layer message needs to be processed at the user plane protocol layer and then transmitted on an air interface; an NAS layer message is transmitted on an air interface by being encapsulated in an RRC message; and on an S1-MME interface transmission is performed over an S1 connection.

In an existing LTE/LTE-A network, all of RRC/RDCP/RLC/MAC/PHY peer layers of the UE are located in the same eNB, and an NAS peer layer of the UE is located in an MME established with the eNB an S1 connection for the UE.

In the existing protocol, PDCP and RLC entities correspond to a Data Radio Bearer (DRB)/Signaling Radio Bearer (SRB) 1/SRB2, and each DRB/SRB1/SRB2 corresponds to a set of PDCP and RLC entities; and the DRB/SRB1/SRB2 are converged at the MAC layer. Thus there may be multiple sets of PDCP and RLC entities but only one MAC layer and physical layer entities for the UE. The SRB is a control plane bearer, and the DRB is a user plane bearer.

In an existing layered network as illustrated in FIG. 4, a macro cell provides underlying coverage, a Local Cell provides hotspot coverage, there is a data/signaling interface (wired/wireless interface) between the Local Cell and the Macro Cell, and the UE may operate in a macro eNB or a local eNB.

Due to a small coverage of, and a small number of UEs, served by the cell controlled by the local eNB, the UEs connected with the local eNB tend to be provided with a better quality of service, e.g., a higher rate for service, a link with a higher quality, etc. Thus when the UE connected with the macro eNB is close to the cell controlled by the local eNB, the UE can be switched to the local eNB to be served by the local eNB; and when the UE is far away from the cell controlled by the local eNB, the UE needs to be switched to the cell controlled by the macro eNB to keep wireless connection. As the number of local eNBs with small coverage is large, the UE has to be switched frequently between the macro eNB cell and the local eNB cell. For a UE, both the switch frequency and the number of times of the switch are greatly increased so that a risk of interruption of communications of the UE being switched is increased.

In summary, currently in the network architecture of the E-UTRAN, both the switch frequency and the number of times of the switch for a UE are greatly increased so that a risk of interruption of communications of the UE being switched is increased.

SUMMARY OF THE INVENTION

Embodiments of the present invention provide a method and a system and a device for switching so as to address such a problem in the prior art that in the network architecture of the E-UTRAN, both the switch frequency and the number of times of the switch for a UE are greatly increased so that a risk of interruption of communications of the UE being switched is increased.

An embodiment of the present invention provides a method of switching, the method including:

receiving, by a user equipment, a DRB reconfiguration message from a macro eNB; and maintaining, by the user equipment, the Packet Data Convergence Protocol, PDCP, layers corresponding to all the DRBs of the control plane and the user plane at the macro eNB, and switching the other layers than the PDCP layers corresponding to a part or all the DRBs of the user plane to at least one eNB.

An embodiment of the present invention provides another method of switching, the method including:

determining, by a macro eNB, that a user equipment needs to be reconfigured with Data Radio Bearers, DRBs; and transmitting, by the macro eNB, a DRB reconfiguration message to the user equipment to instruct the user equipment to maintain the Packet Data Convergence Protocol, PDCP, layers corresponding to all the DRBs of the control plane and the user plane at the macro eNB and switch the other layers than the PDCP layers corresponding to a part or all of the DRBs of the user plane to at least one eNB.

An embodiment for the present invention provides still another method of switching, the method including:

receiving, by a local eNB, a bearer setup request message for a user equipment from a macro eNB; and admitting, the local eNB, the other layers than the Packet Data Convergence Protocol, PDCP, layers corresponding to a part or all of the DRBs of the user plane.

An embodiment of the present invention provides a user equipment for switching, the user equipment including:

a first receiving component configured to receive a Data Radio Bearer, DRB, reconfiguration message from a macro eNB; and a first processing component configured to maintain the Packet Data Convergence Protocol, PDCP, layers corresponding to all the DRBs of the control plane and the user plane at the macro eNB and to switch the other layers than the PDCP layers corresponding to a part or all the DRBs of the user plane to at least one eNB.

An embodiment of the present invention provides a macro eNB for switching, the macro eNB including:

a determining unit configured to determine that a user equipment needs to be reconfigured with Data Radio Bearers, DRBs; and a second processing component configured to transmit a DRB reconfiguration message to the user equipment to instruct the user equipment to maintain the Packet Data Convergence Protocol, PDCP, layers corresponding to all the DRBs of the control plane and the user plane at the macro eNB and switch the other layers than the PDCP layers corresponding to a part or all of the DRBs of the user plane to at least one eNB.

An embodiment of the present invention provides a local eNB for switching, the local eNB including:

a second receiving component configured to receive a bearer setup request message for a user equipment from a macro eNB; and a third processing component configured to admit the other layers than the Packet Data Convergence Protocol, PDCP, layers corresponding to a part or all of the DRBs of the user plane.

An embodiment of the present invention provides a system for switching, the system including:

a macro eNB configured to determine a user equipment needs to be reconfigured with Data Radio Bearers, DRBs, and to transmit a DRB reconfiguration message to the user equipment to instruct the user equipment to maintain the Packet Data Convergence Protocol, PDCP, layers corresponding to all the DRBs of the control plane and the user plane at the macro eNB and switch the other layers than the PDCP layers corresponding to a part or all of the DRBs of the user plane to at least one eNB; and the user equipment configured to receive the DRB reconfiguration message from the macro eNB and to maintain the PDCP layers corresponding to all the DRBs of the control plane and the user plane at the macro eNB and switch the other layers than the PDCP layers corresponding to a part or all of the DRBs of the user plane to at least one eNB.

In embodiments of the present invention, the number of times that the user equipment is switched in the control plane can be reduced to thereby reduce the risk of interruption of communications of the UE being switched in the case that both the switch frequency and the number of times of the switch for a UE are increased in the network architecture of the E-UTRAN.

DETAILED DESCRIPTION OF THE EMBODIMENTS

In embodiments of the present invention, a user equipment maintains the PDCP layers corresponding to all the DRBs of the control plane and the user plane at a macro eNB, and switches the other layers than the PDCP layers corresponding to a part or all the DRBs of the user plane to at least one eNB. In embodiments of the present invention, the number of times that the user equipment is switched in the control plane can be reduced to thereby reduce a risk of interruption of communications of the UE being switched in the case that both the switch frequency and the number of times of the switch for a UE are increased in the network architecture of the E-UTRAN.

The macro eNB is an LTE macro eNB; and a local eNB is a Pico eNB or a Home eNB or a Relay device or the like of the LTE.

In an implementation, when an access point is switched, the PDCP layers of all the DRBs are still maintained at the macro eNB without being changed; when the access point is switched, a security key of the UE will not be changed in the course of switching; and when the user plane is separated from the control plane, the UE and a destination local eNB configure an MAC entity of a destination access point only in a mode in which all or a part of the DRBs are handled, and also configure the corresponding PHY layers to only process data related to DRB.

Figure 1:
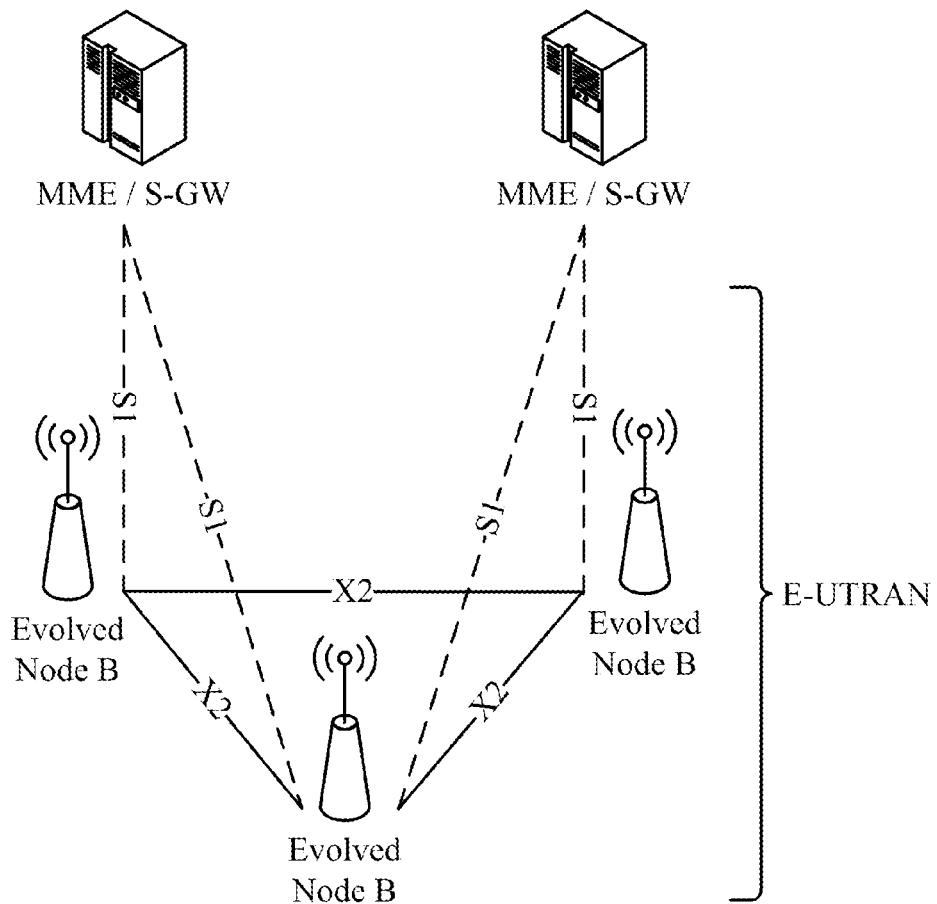
FIG. 1 is a schematic diagram of the network architecture of the E-UTRAN in the prior art.
Figure 2:
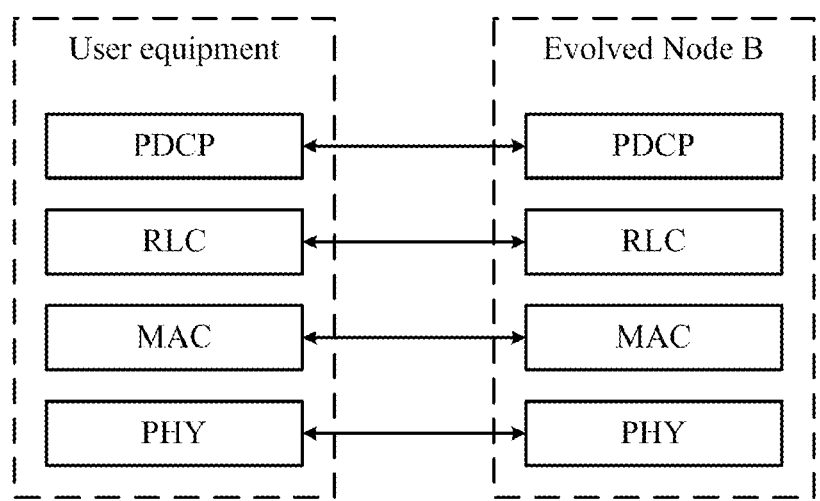
FIG. 2 is a schematic diagram of the user plane protocol stack between the UE and the network in the prior art.
Figure 3:
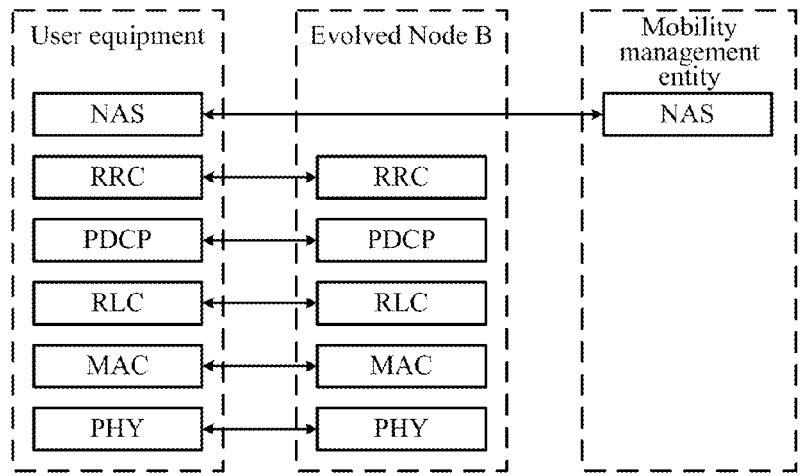
FIG. 3 is a schematic diagram of the control plane protocol stack between the UE and the network in the prior art.
Figure 4:
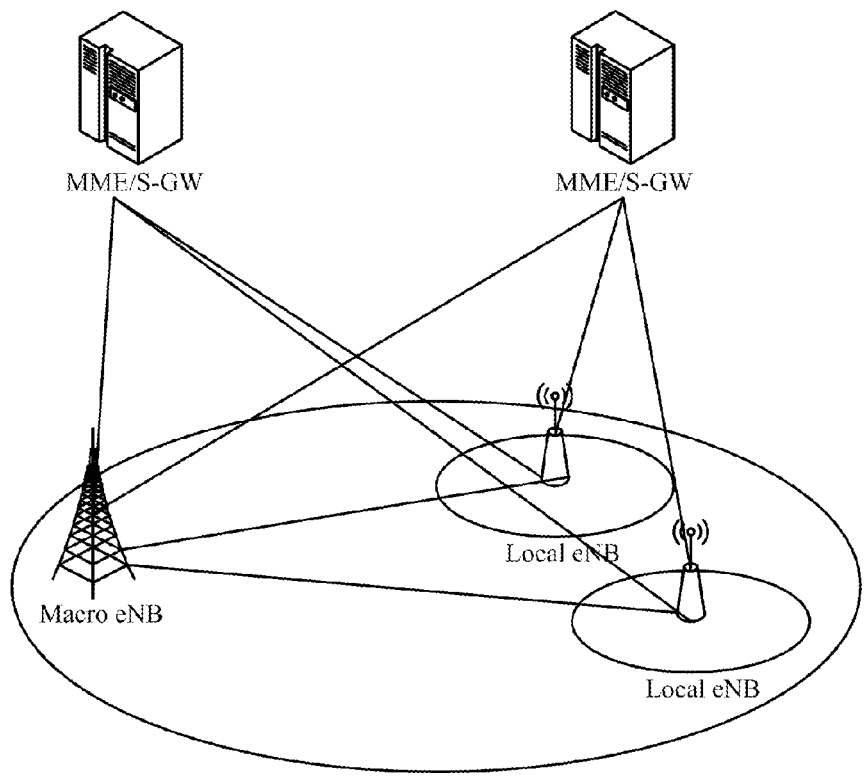
FIG. 4 is a schematic diagram of the deployment scenario of the layered network in the prior art.
Figure 5:
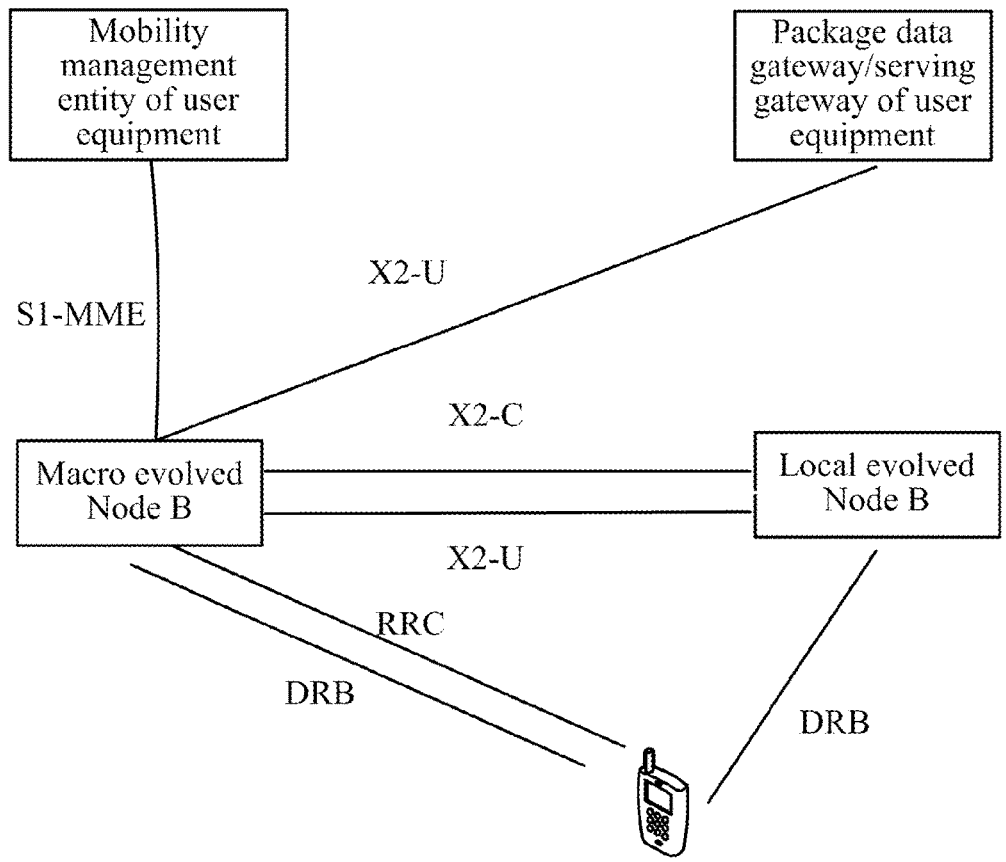
FIG. 5 is a schematic diagram of separation of the user plane and the control plane according to an embodiment of the present invention.

In order to reduce the frequency at which the UE is switched between a macro eNB cell and a local eNB cell, such a network deployment scheme is introduced that the user plane is separated from the control plane. As illustrated in FIG. 5, in this scheme, when the UE is located in an area covered only by the macro eNB cell, both the control plane connection and the user plane of the UE are connected with the macro eNB; and when the UE moves to an area covered by both the macro eNB cell and the local eNB cell, all or a part of the bearers of the UE in the user plane are transferred to the local eNB for a higher service transmission rate; and the control plane connection is still maintained at the macro eNB to thereby prevent a dropped call of the UE due to a failure of switching the control plane connection.

In the case that the user plane of the UE is separated from the control plane, the UE is connected concurrently with two or more eNBs. The UE is connected with both the macro eNB and the local eNB to be provided with the control plane connection and the user plane connection respectively.

A part of the bearers of the UE in the user plane are separated from the control plane. For example, a user plane bearer to carry voice and other service sensitive to interruption time and with a low bandwidth demand is maintained at the macro eNB; and a user plane bearer to carry an Internet and other service insensitive to interruption time and with a high bandwidth demand.

Figure 6:
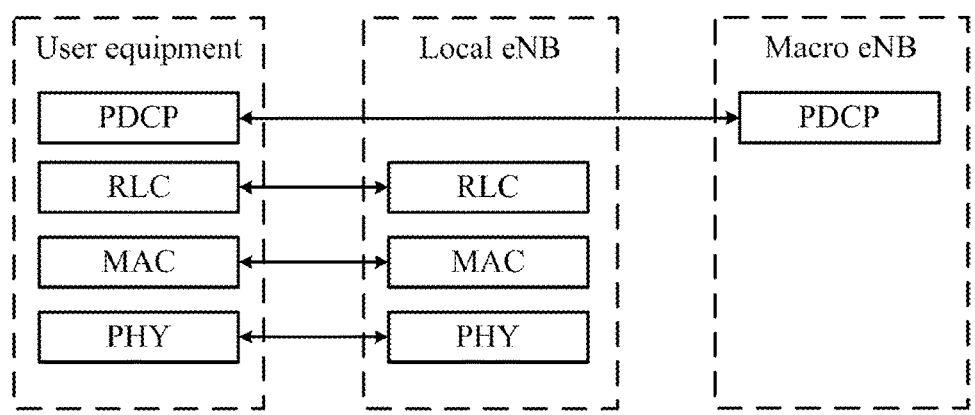
FIG. 6 is a schematic diagram of a user plane protocol stack between a UE and a network according to an embodiment of the present invention.
Figure 7:
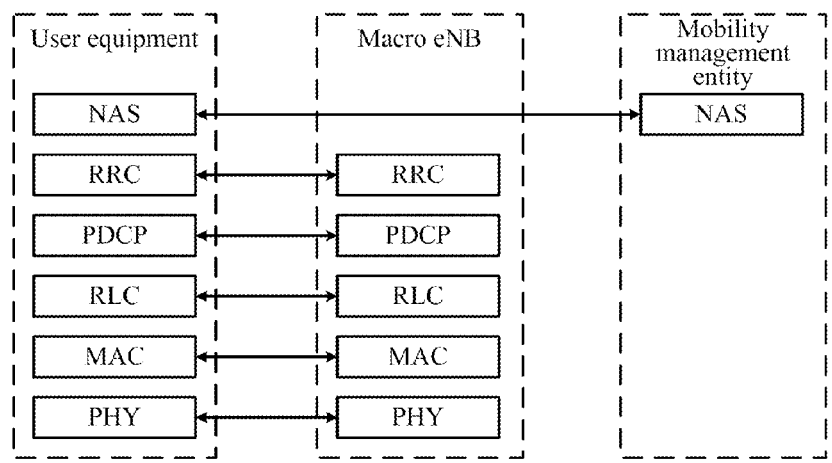
FIG. 7 is a schematic diagram of a control plane protocol stack between a UE and a network according to an embodiment of the present invention.

In the case that the user plane is separated from the control plane, FIG. 6 and FIG. 7 illustrate protocol stacks between the UE and the network. The user plane eNB (local eNB) of the UE provides the UE with a function of transmitting user plane data but has no RRC layer peering to that of the UE and can not perform RRC control on the UE; and the control plane eNB (macro eNB) of the UE provides the UE with a function of transmitting a control plane message, and in order to carry and process an RRC message, the control plane eNB needs to have a user plane protocol stack peering to that of the UE. Since an NAS message needs to be carried in an RRC message, a serving MME of the UE is connected with the control plane eNB of the UE.

As an enhancement, there may be a part of RRC functions between the UE and the user plane eNB, for example, the UE can read a broadcast message transmitted by the user plane eNB (a point-to-multipoint RRC message transmitted by the eNB to a plurality of UEs).

In order to support the architecture above in which the user plane is separated from the control plane, a user plane node switching method corresponding to the architecture will be performed in the embodiments of the present invention.

The embodiments of the present invention will be described below in further details with reference to the drawings.

In the following description, firstly an implementation with cooperation of the network side and the user equipment side will be described, and then implementations at the network side and the user equipment side will be described respectively, but this will not suggest required cooperation of both the sides for an implementation, and in fact, problems present respectively at the network side and the user equipment side will also be addressed in the separate implementations at the network side and the user equipment side, although a better technical effect can be achieved in the implementation with cooperation of both the sides.

Figure 8:
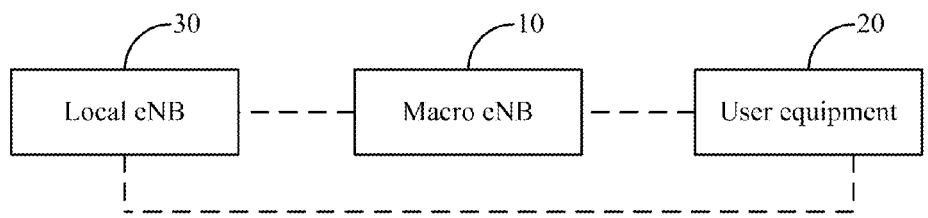
FIG. 8 is a schematic structural diagram of a system for switching according to an embodiment of the present invention.

As illustrated in FIG. 8, a system for switching according to an embodiment of the present invention includes a macro eNB 10 and a user equipment 20.

The macro eNB 10 is configured to determine that a user equipment needs to be reconfigured with DRBs, and to transmit a DRB reconfiguration message to the user equipment 20 to instruct the user equipment 20 to maintain the PDCP layers corresponding to all the DRBs of the control plane and the user plane at the macro eNB and switch the other layers than the PDCP layers corresponding to a part or all of the DRBs of the user plane to at least one eNB; and The user equipment 20 is configured to receive the DRB reconfiguration message from the macro eNB and to maintain the PDCP layers corresponding to all the DRBs of the control plane and the user plane at the macro eNB and switch the other layers than the PDCP layers corresponding to a part or all of the DRBs of the user plane to at least one eNB.

The user equipment in the embodiment of the present invention can be located in an area covered by both a macro cell and a local cell.

In an implementation, if the DRB reconfiguration message is an RRC reconfiguration message, then the macro eNB 10 transmits the RRC reconfiguration message to the user equipment 20; and Correspondingly upon reception of the RRC reconfiguration message from the macro eNB, the user equipment 20 maintains the PDCP layers corresponding to all the DRBs of the control plane and the user plane at the macro eNB and switches the other layers than the PDCP layers corresponding to a part or all of the DRBs of the user plane to at least one eNB.

In order to be distinguished from the existing RRC reconfiguration message (that is, all of the user plane and the control are switched) in the LTE, the macro eNB 10 can add information to the RRC reconfiguration message to instruct the user plane to be switched, e.g., 1-bit information to instruct the user plane to be switched. Alternatively a new RRC reconfiguration message can be created.

The other layers than the PDCP layers corresponding to a part or all of the DRBs of the user plane are switched to at least one eNB, where the eNB here includes but will not be limited to a part or all of the following eNBs: a macro eNB and a local eNB.

In an implementation, the macro eNB 10 is further configured to transmit a bearer setup request message to a local eNB intended to admit the user plane; and correspondingly the system according to the embodiment of the present invention can further include a local eNB 30.

The local eNB 30 is configured to receive the bearer setup request message for the user equipment from the macro eNB and to admit the other layers than the PDCP layers corresponding to a part or all of the DRBs of the user plane.

Different scenarios will be described below in details.

In a first scenario, the switching is performed by separating the other layers than the PDCP layers corresponding to a part or all of the DRBs of the user plane from the control plane, that is, the other layers than the PDCP layers corresponding to a part or all of the DRBs of the user plane are switched from a macro eNB to at least one local eNB.

The macro eNB 10 transmits the bearer setup request message, including Quality of Service (QoS) information of DRBs of each user plane to be switched, to the local eNB 30 intended to admit the bearers of the user plane.

The local eNB 30 determines DRBs, that can be admitted, from the QoS information of the DRBs to be switched for the user equipment and configures the other layers than the PDCP layers corresponding to the DRBs of the user plane to be admitted according to the QoS information.

For example the local eNB 30 allocates dedicated resources, etc., including logical channels, MAC layer configurations, physical layer configurations, etc., for the DRBs of the user plane to be admitted and creates corresponding entities.

The local eNB 30 sends a bearer setup request response message to the macro eNB 10 after configuring the other layers than the PDCP layers corresponding to the DRBs of the user plane to be admitted.

Correspondingly the macro eNB 10 transmits an RRC reconfiguration message to the user equipment 20 upon reception of the bearer setup request response message from the local eNB 30; and The user equipment configures the other layers than the PDCP layers corresponding to the DRBs of the user plane according to configuration information in the received RRC reconfiguration message.

The user equipment 20 configures new RLC entities according to the configuration information in the RRC reconfiguration message, creates a mapping relationship between the original PDCP and the new RLC entities, activates a set of a PHY entity and a MAC entity dedicated to the DRB, and is synchronized, through the activated PHY entity and MAC entity, with newly connected eNB after switching.

For example, if the user equipment 20 needs to switch a DRB1 of the user plane to a local eNB A, then the user equipment 20 will configure an RLC entity of the DRB1 for the local eNB A according to the configuration information in the RRC reconfiguration message and then create a mapping relationship between the PDCP of the DRB1 for the macro eNB and the RLC entity of the DRB1 for the local eNB A, activate a set of a PHY entity and an MAC entity dedicated to the DRB1 for the local eNB A, and be synchronized with the local eNB A through the PHY entity and the MAC entity for the local eNB A.

In an implementation, the configuration information includes but will not be limited to at least one of the following information:

RLC logical channel configuration information, MAC layer configuration information and physical layer configuration information.

The user equipment 20 can further release the RLC layers of the switched DRBs, and the mapping relationship between the RLC layers and the MAC and PHY layers, after switching the other layers than the PDCP layers corresponding to a part or all of the DRBs of the user plane to at least one eNB.

The user equipment 20 sends an RRC reconfiguration complete message to the macro eNB 10 after switching the other layers than the PDCP layers corresponding to a part or all of the DRBs of the user plane to at least one eNB; and Correspondingly, upon reception of the RRC reconfiguration complete message, for a DRB of the user plane that can be admitted by the local eNB 30, the macro eNB 10 maps an PDCP entity corresponding to the DRB to the other layers corresponding to the DRB configured by the local eNB 30, and releases the RLC layers of the switched DRBs of the user equipment and the mapping relationship between the RLC layers and the MAC and PHY layers.

In a second scenario, the switching is performed by converging the other layers than the PDCP layers corresponding to a part or all of the DRBs of the user plane with the control plane, that is, the other layers than the PDCP layers corresponding to a part or all of the DRBs of the user plane are switched from at least one local eNB to a macro eNB.

The macro eNB 10 configures the other layers than the PDCP layers corresponding to the DRBs of the user plane to be admitted according to QoS information of the DRBs to be switched for the user equipment.

The macro eNB 10 transmits an RRC reconfiguration message to the user equipment 20 after configuring the other layers than the PDCP layers corresponding to the DRBs of the user plane to be admitted; and The user equipment configures the other layers than the PDCP layers corresponding to the DRBs of the user plane according to configuration information in the received RRC reconfiguration message.

The user equipment 20 configures new RLC entities according to the configuration information in the RRC reconfiguration message, creates a mapping relationship between the original PDCP and the new RLC entities, activates a set of a PHY entity and a MAC entity dedicated to the DRB, and is synchronized, through the activated PHY entity and MAC entity, with newly connected eNB after switching.

For example, if the user equipment 20 needs to switch a DRB1 of the user plane to a local eNB A, then the user equipment 20 will configure an RLC entity of the DRB1 for the local eNB A according to the configuration information in the RRC reconfiguration message, and then create a mapping relationship between the PDCP of the DRB1 for the macro eNB and the RLC entity of the DRB1 for the local eNB A, activate a set of a PHY entity and an MAC entity of the DRB1 for the local eNB A and be synchronized with the local eNB A through the PHY entity and the MAC entity for the local eNB A.

In an implementation, the configuration information includes but will not be limited to at least one of the following information:

RLC logical channel configuration information, MAC layer configuration information and physical layer configuration information.

The user equipment 20 can further releases the RLC layers of the switched DRBs, and the mapping relationship between the RLC layers and the MAC and PHY layers, after switching the other layers than the PDCP layers corresponding to a part or all of the DRBs of the user plane to at least one eNB.

The user equipment 20 sends an RRC reconfiguration complete message to the macro eNB 10, after switching the other layers than the PDCP layers corresponding to a part or all of the DRBs of the user plane to at least one eNB; and Correspondingly, upon reception of the RRC reconfiguration complete message, the macro eNB 10 instructs a specific eNB to release the RLC layers of the switched DRBs of the user equipment, and the mapping relationship between the RLC layers and the MAC and PHY layers, where the specific eNB is such an eNB that the number of user plane DRBs of the user equipment is reduced after switching; and The local eNB 30 releases the RLC layers of the switched DRBs of the user equipment, and the mapping relationship between the RLC layers and the MAC and PHY layers, upon reception of the instruction from the macro eNB to release the other entities corresponding to the switched DRBs of the user plane.

In a third scenario, the switching is performed by transferring the other layers than the PDCP layers corresponding to a part or all of the DRBs of the user plane between local eNBs, that is, the other layers than the PDCP layers corresponding to a part or all of the DRBs of the user plane are switched from at least one local eNB to at least one local eNB.

The macro eNB 10 transmits a bearer setup request message, including QoS information of DRBs of each user plane to be switched, to the local eNB 30 intended to admit the bearers of the user plane.

The local eNB 30 determines DRBs, that can be admitted, from the QoS information of the DRBs to be switched for the user equipment, and configures the other layers than the PDCP layers corresponding to the DRBs of the user plane to be admitted according to the QoS information.

The local eNB 30 sends a bearer setup request response message to the macro eNB 10, after configuring the other layers than the PDCP layers corresponding to the DRBs of the user plane to be admitted.

Correspondingly, the macro eNB 10 transmits an RRC reconfiguration message to the user equipment 20, upon reception of the bearer setup request response message from the local eNB 30; and The user equipment configures the other layers than the PDCP layers corresponding to the DRBs of the user plane according to configuration information in the received RRC reconfiguration message.

The user equipment 20 configures new RLC entities according to the configuration information in the RRC reconfiguration message, creates a mapping relationship between the original PDCP and the new RLC entities, activates a set of a PHY entity and a MAC entity dedicated to the DRB, and is synchronized, through the activated PHY entity and MAC entity, with newly connected eNB after switching.

For example, if the user equipment 20 needs to switch a DRB1 of the user plane to a local eNB A, then the user equipment 20 will configure an RLC entity of the DRB1 for the local eNB A according to the configuration information in the RRC reconfiguration message and then create a mapping relationship between the PDCP of the DRB1 for the macro eNB and the RLC entity of the DRB1 for the local eNB A, activate a set of a PHY entity and an MAC entity dedicated to the DRB1 for the local eNB A, and be synchronized with the local eNB A through the PHY entity and the MAC entity for the local eNB A.

In an implementation, the configuration information includes but will not be limited to at least one of the following information:

RLC logical channel configuration information, MAC layer configuration information and physical layer configuration information.

The user equipment 20 can further release the RLC layers of the switched DRBs, and the mapping relationship between the RLC layers and the MAC and PHY layers, after switching the other layers than the PDCP layers corresponding to a part or all of the DRBs of the user plane to at least one eNB.

The user equipment 20 sends an RRC reconfiguration complete message to the macro eNB 10 after switching the other layers than the PDCP layers corresponding to a part or all of the DRBs of the user plane to at least one eNB; and Correspondingly, upon reception of the RRC reconfiguration complete message, the macro eNB 10 instructs a specific eNB to release the RLC layers of the switched DRBs of the user equipment, and the mapping relationship between the RLC layers and the MAC and PHY layers, where the specific eNB is such an eNB that the number of user plane DRBs of the user equipment is reduced after switching; and The local eNB 30 releases the RLC layers of the switched DRBs of the user equipment, and the mapping relationship between the RLC layers and the MAC and PHY layers, upon reception of the instruction from the macro eNB to release the other entities corresponding to the switched DRBs of the user plane.

For a DRB of the user equipment in an Acknowledgement Mode (AM), the macro eNB 10 will retransmit and transmit all the subsequent data packets starting with a first PDCP SDU which has not been acknowledged by an underlying layer; or retransmit only PDCP SDUs which have not been acknowledged by the underlying layer and PDCP SDUs which have not been subsequently transmitted through the underlying layer; or transmit data packets which have not been received by a peering end and all the subsequent new data packets dependent upon a PDCP status report.

For a DRB of the user plane in a Un-acknowledgment Mode (UM), the macro eNB 10 will retransmit all the subsequent data packets starting with a first PDCP SDU which has not been transmitted through an underlying layer.

If the macro eNB is a transmitter of a DRB in an AM or a receiver of a DRB in a UM, then the macro eNB 10 preserves the SN and all the status variables, and maintains all the states and algorithms of encryption, integrity protection and header compression.

Figure 9:
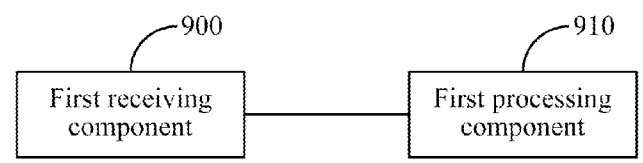
FIG. 9 is a schematic structural diagram of a user equipment in a system for switching according to an embodiment of the present invention.

As illustrated in FIG. 9, a user equipment in a system for switching according to an embodiment of the present invention includes a first receiving component 900 and a first processing component 910.

The first receiving component 900 is configured to receive a DRB reconfiguration message from a macro eNB; and The first processing component 910 is configured to maintain the PDCP layers corresponding to all the DRBs of the control plane and the user plane at the macro eNB, and to switch the other layers than the PDCP layers corresponding to a part or all the DRBs of the user plane to at least one eNB.

The first receiving component 900 can be an antenna or another receiving component, and the first processing component 910 can be a Central Processing Unit (CPU), a Digital Signal Processor (DSP), a Field Programmable Gate Array (FPGA), etc.

The DRB reconfiguration message is an RRC reconfiguration message.

The first receiving component 900 is configured to configure the other layers than the PDCP layers corresponding to the DRBs of the user plane according to configuration information in the received RRC reconfiguration message.

The first receiving component 900 is configured to configure new RLC entities according to the configuration information in the RRC reconfiguration message, to create a mapping relationship between the original PDCP and the new RLC entities, to activate a set of a PHY entity and a MAC entity dedicated to the DRB, and to establish synchronization, through the activated PHY entity and MAC entity, with newly connected eNB after switching.

The first receiving component 900 is configured to send an RRC reconfiguration complete message to the macro eNB after the other layers than the PDCP layers corresponding to a part or all of the DRBs of the user plane are switched to at least one eNB.

Figure 10:
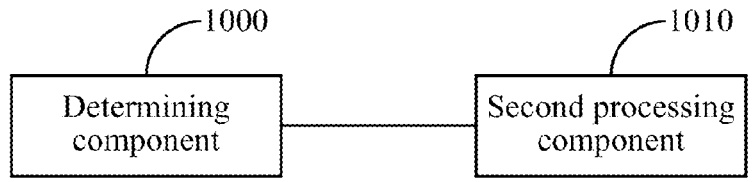
FIG. 10 is a schematic structural diagram of a macro eNB in a system for switching according to an embodiment of the present invention.

As illustrated in FIG. 10, a macro eNB in a system for switching according to an embodiment of the present invention includes a determining component 1000 and a second processing component 1010.

The determining unit 1000 is configured to determine that DRBs of a user equipment needs to be reconfigured with DRBs; and The second processing component 1010 is configured to transmit a DRB reconfiguration message to the user equipment to instruct the user equipment to maintain the PDCP layers corresponding to all the DRBs of the control plane and the user plane at the macro eNB. and switch the other layers than the PDCP layers corresponding to a part or all of the DRBs of the user plane to at least one eNB.

The determining unit 1000 can be an antenna or another receiving component, and the second processing component 1010 can be a Central Processing Unit (CPU), a Digital Signal Processor (DSP), a Field Programmable Gate Array (FPGA), etc.

The DRB reconfiguration message is an RRC reconfiguration message.

The switching is performed by separating the other layers than the PDCP layers corresponding to a part or all of the DRBs of the user plane from the control plane, or by transferring the other layers than the PDCP layers corresponding to a part or all of the DRBs of the user plane between local eNBs; and the second processing component 1010 is configured to transmit a bearer setup request message, including QoS information of DRBs of each user plane to be switched, to an eNB intended to admit the DRBs of the user plane before transmitting the DRB reconfiguration message to the user equipment.

The second processing component 1010 is configured to transmit the DRB reconfiguration message to the user equipment upon reception of a bearer setup request response message from the eNB.

The second processing component 1010 is configured, for a DRB of the user plane that can be admitted by the eNB, to map an PDCP entity corresponding to the DRB to the other layers corresponding to the DRB configured by the eNB, after transmitting the DRB reconfiguration message to the user equipment and upon reception of an RRC reconfiguration complete message from the user equipment.

The switching is performed by separating the other layers than the PDCP layers corresponding to a part or all of the DRBs of the user plane from the control plane; and the second processing component 1010 is configured to release the RLC layers of the switched DRBs of the user equipment, and a mapping relationship between the RLC layers and the MAC and PHY layers, after transmitting the RRC reconfiguration message to the user equipment and receiving an RRC reconfiguration complete message from the user equipment.

The switching is performed by transferring the other layers than the PDCP layers corresponding to a part or all of the DRBs of the user plane between local eNBs; and the second processing component 1010 is configured to instruct a specific eNB to release the RLC layers of the switched DRBs of the user equipment, and a mapping relationship between the RLC layers and the MAC and PHY layers, after transmitting the RRC reconfiguration message to the user equipment and upon reception of an RRC reconfiguration complete message from the user equipment;

The specific eNB is such an eNB that the number of user plane DRBs of the user equipment is reduced after switching.

The switching is performed by converging the other layers than the PDCP layers corresponding to a part or all of the DRBs of the user plane with the control plane; and the second processing component 1010 is configured to instruct a specific eNB to release the RLC layers of the switched DRBs of the user equipment and a mapping relationship between the RLC layers and the MAC and PHY layers, after transmitting the RRC reconfiguration message to the user equipment and after admitting successfully the user plane of the user equipment;

The specific eNB is such an eNB that the number of user plane DRBs of the user equipment is reduced after switching.

The second processing component 1010 is configured, for a DRB of the user plane in an AM, to retransmit and transmit all the subsequent data packets starting with a first PDCP SDU which has not been acknowledged by an underlying layer; or to retransmit only PDCP SDUs which have not been acknowledged by the underlying layer and PDCP SDUs which have not been subsequently transmitted through the underlying layer; or to transmit data packets which have not been received by a peering end and all the subsequent new data packets dependent upon a PDCP status report, after transmitting the RRC reconfiguration message to the user equipment.

The second processing component 1010 is configured, for a DRB of the user plane in a UM, to retransmit all the subsequent data packets starting with a first PDCP SDU which has not been transmitted through an underlying layer, after transmitting the RRC reconfiguration message to the user equipment.

After the second processing component 1010 transmits the RRC reconfiguration message to the user equipment, if the macro eNB is a transmitter of a DRB in an AM or a receiver of a DRB in a UM, then the second processing module 1010 is configured to preserve the SN and all the status variables and maintains all the states and algorithms of encryption, integrity protection and header compression.

Figure 11:
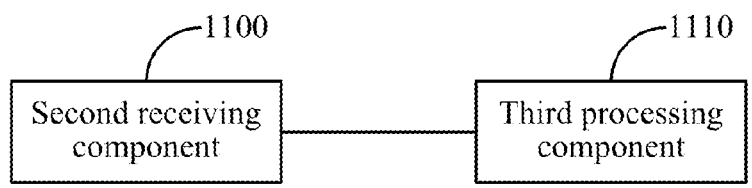
FIG. 11 is a schematic structural diagram of a local eNB in a system for switching according to an embodiment of the present invention.

As illustrated in FIG. 11, a local eNB in a system for switching according to an embodiment of the present invention includes a second receiving component 1100 and a third processing component 1110.

The second receiving component 1100 is configured to receive a bearer setup request message for a user equipment from a macro eNB; and The third processing component 1110 is configured to admit the other layers than the PDCP layers corresponding to a part or all of the DRBs of the user plane.

The second receiving component 1100 can be embodied as a device composed of both a radio frequency channel and an antenna, and the third processing component 1110 can be a Central Processing Unit (CPU), a Digital Signal Processor (DSP), a Field Programmable Gate Array (FPGA), etc.

The third processing component 1110 is configured to configure the other layers than the PDCP layers corresponding to the DRBs of the user plane to be admitted, according to Quality of Service (QoS) information, of DRBs of each user plane to be switched, included in the bearer setup request message.

The third processing component 1110 is configured to send a bearer setup request response message to the macro eNB, after admitting the other layers than the PDCP layers corresponding to a part of all of the DRBs of the user plane.

The third processing component 1110 is configured to release the RLC layers of the switched DRBs of the user equipment, and a mapping relationship between the RLC layers and the MAC and PHY layers, upon reception of an instruction from the macro eNB to release the other entities corresponding to the switched DRBs of the user plane.

Based upon the same inventive idea, embodiments of the present invention further provide a method of switching by a user equipment, a method of switching for a user equipment by a macro eNB and a method of switching for a user equipment by a local eNB, and since these methods address the problem under a principle similar to the system for switching according to the embodiment of the present invention in FIG. 8, reference can be made to the implementation of the system for implementations of these methods, so a repeated description thereof will be omitted here.

Figure 12:
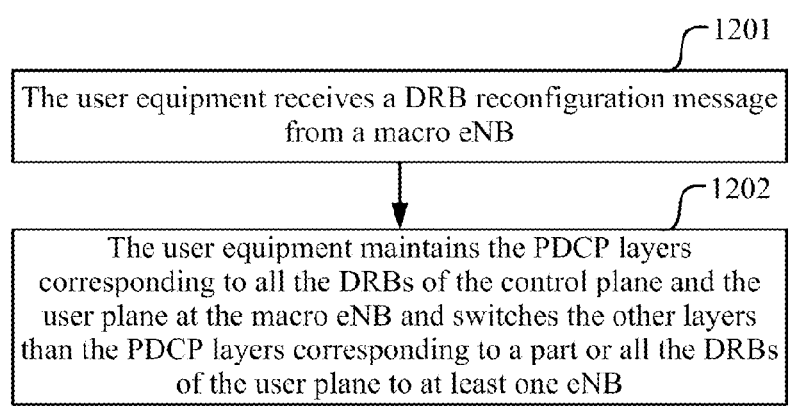
FIG. 12 is a schematic flow chart of a method of switching by a user equipment according to an embodiment of the present invention.

As illustrated in FIG. 12, a method of switching by a user equipment according to an embodiment of the present invention includes the following operations:

In the operation 1201, the user equipment receives a DRB reconfiguration message from a macro eNB; and In the operation 1202, the user equipment maintains the PDCP layers corresponding to all the DRBs of the control plane and the user plane at the macro eNB and switches the other layers than the PDCP layers corresponding to a part or all the DRBs of the user plane to at least one eNB.

The DRB reconfiguration message is an RRC reconfiguration message.

The user equipment switching the other layers than the PDCP layers corresponding to a part or all the DRBs of the user plane to at least one eNB includes:

The user equipment configures the other layers than the PDCP layers corresponding to the DRBs of the user plane, according to configuration information in the received RRC reconfiguration message.

The user equipment configuring the DRBs of the user plane includes:

The user equipment configures new RLC entities according to the configuration information in the RRC reconfiguration message, creates a mapping relationship between the original PDCP and the new RLC entities, activates a set of a PHY entity and a MAC entity dedicated to the DRB, and is synchronized, through the activated PHY entity and MAC entity, with newly connected eNB after switching.

After the user equipment switches the other layers than the PDCP layers corresponding to a part or all of the DRBs of the user plane to at least one eNB, the method further includes:

The user equipment sends an RRC reconfiguration complete message to the macro eNB.

Figure 13:
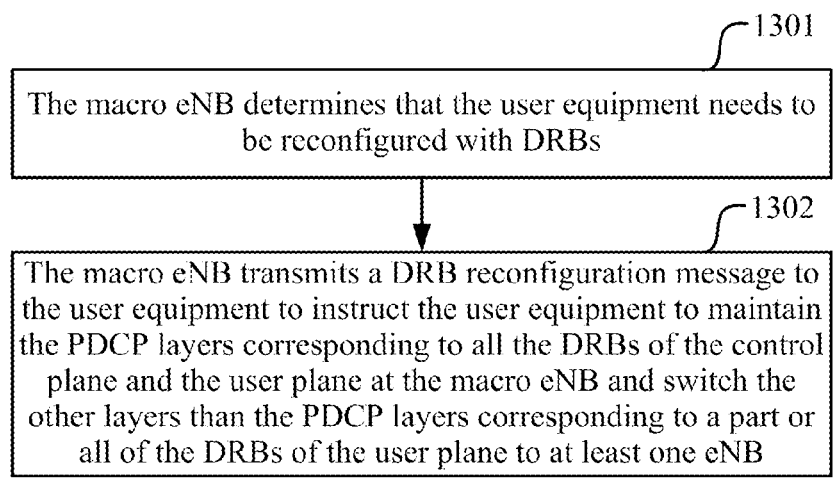
FIG. 13 is a schematic flow chart of a method of switching for a user equipment by a macro eNB according to an embodiment of the present invention.

As illustrated in FIG. 13, a method of switching a user equipment in a macro eNB according to an embodiment of the present invention includes the following operations:

In the operation 1301, the macro eNB determines that the user equipment needs to be reconfigured with DRBs; and In the operation 1302, the macro eNB transmits a DRB reconfiguration message to the user equipment to instruct the user equipment to maintain the PDCP layers corresponding to all the DRBs of the control plane and the user plane at the macro eNB and switch the other layers than the PDCP layers corresponding to a part or all of the DRBs of the user plane to at least one eNB.

The DRB reconfiguration message is an RRC reconfiguration message.

The switching is performed by separating the other layers than the PDCP layers corresponding to a part or all of the DRBs of the user plane from the control plane, or by transferring the other layers than the PDCP layers corresponding to a part or all of the DRBs of the user plane between local eNBs; and Before the macro eNB transmits the DRB reconfiguration message to the user equipment, the method further includes:

The macro eNB transmits a bearer setup request message, including QoS information of DRBs of each user plane to be switched, to an eNB intended to admit the DRBs of the user plane.

Before the macro eNB transmits the DRB reconfiguration message to the user equipment, the method further includes:

The macro eNB receives a bearer setup request response message from the eNB.

After the macro eNB transmits the DRB reconfiguration message to the user equipment, the method further includes:

For a DRB of the user plane that can be admitted by the eNB, the macro eNB maps an PDCP entity corresponding to the DRB to the other layers corresponding to the DRB configured by the eNB, upon reception of an RRC reconfiguration complete message from the user equipment.

The switching is performed by separating the other layers than the PDCP layers corresponding to a part or all of the DRBs of the user plane from the control plane; and After the macro eNB transmits the DRB reconfiguration message to the user equipment, the method further includes:

The macro eNB releases the RLC layers of the switched DRBs of the user equipment, and a mapping relationship between the RLC layers and the MAC and PHY layers, upon reception of an RRC reconfiguration complete message from the user equipment.

The switching is performed by transferring the other layers than the PDCP layers corresponding to a part or all of the DRBs of the user plane between local eNBs; and After the macro eNB transmits the DRB reconfiguration message to the user equipment, the method further includes:

The macro eNB instructs a specific eNB to release the RLC layers of the switched DRBs of the user equipment, and mapping relationship between the RLC layers and the MAC and PHY layers, upon reception of an RRC reconfiguration complete message from the user equipment;

The specific eNB is such an eNB that the number of user plane DRBs of the user equipment is reduced after switching.

The switching is performed by converging the other layers than the PDCP layers corresponding to a part or all of the DRBs of the user plane with the control plane; and After the macro eNB transmits the DRB reconfiguration message to the user equipment, the method further includes:

The macro eNB instructs a specific eNB to release the RLC layers of the switched DRBs of the user equipment, and a mapping relationship between the RLC layers and the MAC and PHY layers, after admitting successfully the user plane of the user equipment;

The specific eNB is such an eNB that the number of user plane DRBs of the user equipment is reduced after switching.

After the macro eNB transmits the DRB reconfiguration message to the user equipment, the method further includes:

For a DRB of the user plane in an AM, the macro eNB retransmits and transmits all the subsequent data packets starting with a first PDCP SDU which has not been acknowledged by an underlying layer; or retransmits only PDCP SDUs which have not been acknowledged by the underlying layer and PDCP SDUs which have not been subsequently transmitted through the underlying layer; or transmits data packets which have not been received by a peering end and all the subsequent new data packets dependent upon a PDCP status report.

After the macro eNB transmits the DRB reconfiguration message to the user equipment, the method further includes:

For a DRB of the user plane in a UM, the macro eNB retransmits all the subsequent data packets starting with a first PDCP SDU which has not been transmitted through an underlying layer.

After the macro eNB transmits the DRB reconfiguration message to the user equipment, the method further includes:

If the macro eNB is a transmitter of a DRB in an AM or a receiver of a DRB in a UM, then the macro eNB preserves the SN and all the status variables and maintains all the states and algorithms of encryption, integrity protection and header compression.

FIG. 12 and FIG. 13 can be integrated into a flow of a method of switching, that is, firstly the operation 1031 and the operation 1302 and then the operation 1201 and the operation 1202 can be performed.

Figure 14:
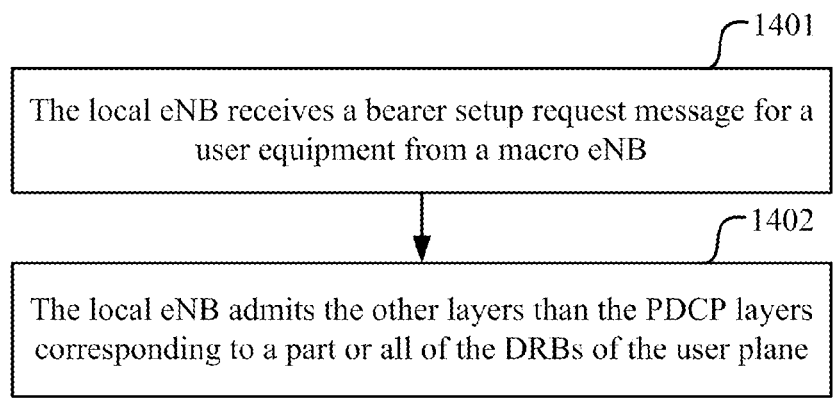
FIG. 14 is a schematic flow chart of a method of switching for a user equipment by a local eNB according to an embodiment of the present invention.

As illustrated in FIG. 14, a method of switching for a user equipment by a local eNB according to an embodiment of the present invention includes the following operations:

In the operation 1401, the local eNB receives a bearer setup request message for a user equipment from a macro eNB; and In the operation 1402, the local eNB admits the other layers than the PDCP layers corresponding to a part or all of the DRBs of the user plane.

The local eNB admitting the other layers than the PDCP layers corresponding to a part or all of the DRBs of the user plane includes:

The local eNB configures the other layers than the PDCP layers corresponding to the DRBs of the user plane to be admitted according to Quality of Service (QoS) information, of DRBs of each user plane to be switched, included in the bearer setup request message.

After the local eNB admits the other layers than the PDCP layers corresponding to a part or all of the DRBs of the user plane, the method further includes:

The local eNB sends a bearer setup request response message to the macro eNB.

The local eNB releases the RLC layers of the switched DRBs of the user equipment, and a mapping relationship between the RLC layers and the MAC and PHY layers of the switched DRBs of the user equipment, upon reception of an instruction from the macro eNB to release the other entities corresponding to the switched DRBs of the user plane.

FIG. 12 to FIG. 14 can be integrated into a flow of a method of switching, that is, firstly the operation 1031 and the operation 1302, then the operation 1201 and the operation 1202 and finally the operation 1401 and the operation 1402 can be performed.

The solution according to the present invention will be described below for the three scenarios above by way of respective examples.

In a first example, a UE is currently connected with only a macro eNB and needs to have all or a part of the DRBs transferred from the macro eNB to a local eNB.

Figure 15:
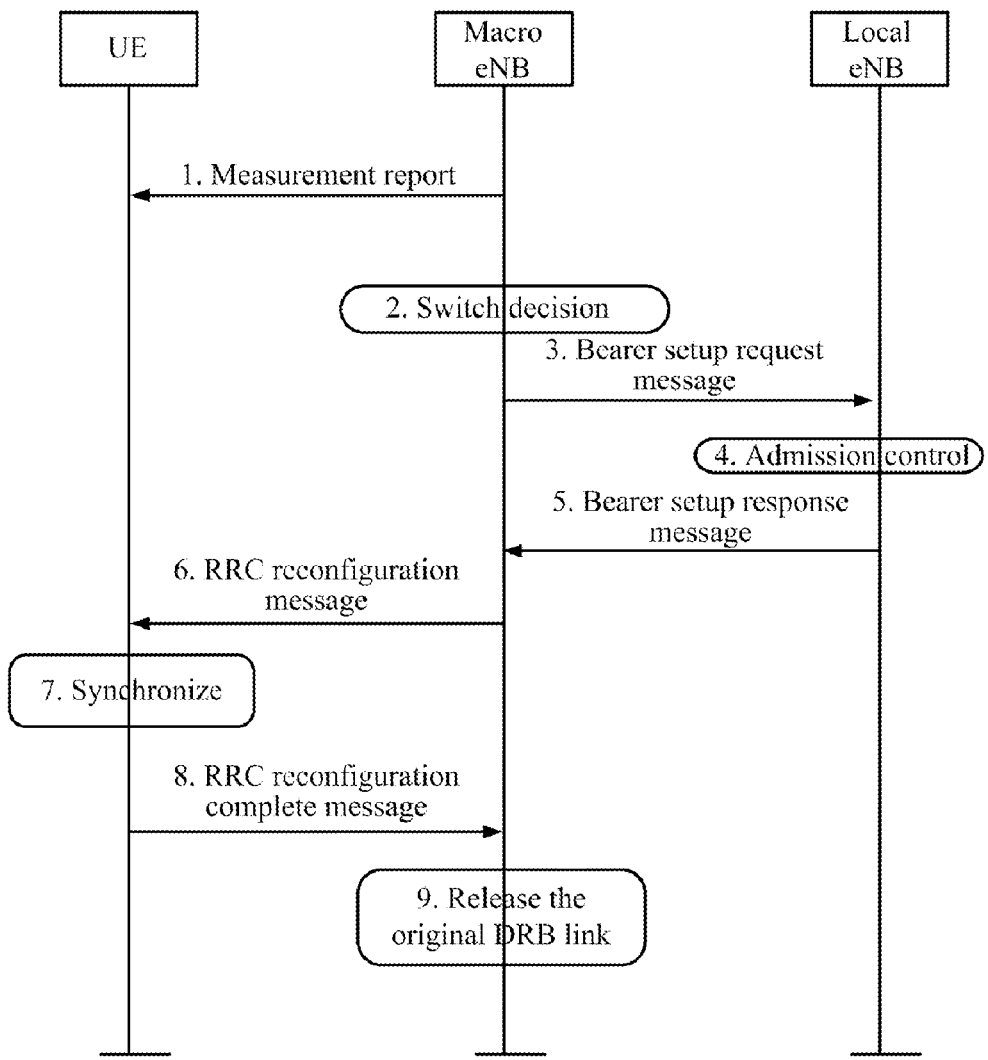
FIG. 15 is a schematic flow chart of a method of switching a control plane bearer from a macro cell to a local cell according to an embodiment of the present invention.

In the case that a DRB is transferred from the macro eNB to the local eNB, as illustrated in FIG. 15, a method of switching a control plane bearer from a macro cell to a local cell according to an embodiment of the present invention includes the following operations:

1. The UE reports measurement report information to the macro eNB;

2. The macro eNB decides to reconfigure a DRB;

3. The macro eNB transmits a DRB link configuration message to a local eNB;

4. The local eNB performs an admission control and then configures the new RLC layer, MAC layer and PHY layer according to parameters in the DRB link configuration message;

5. The local eNB notifies the macro eNB of configuration completion;

6. The macro eNB instructs the UE through an RRC reconfiguration message to reconfigure the DRB;

7. Upon reception of the RRC reconfiguration message, the UE identifies the separation of the control plane from the user plane according to the contents of the message and thereafter activates another set of PHY and MAC entities dedicated to the DRB and is synchronized to a new access point.

8. The UE sends an RRC reconfiguration complete message to the macro eNB and also reconfigures a new DRB link and releases the original DRB link; and 9. Upon reception of the RRC reconfiguration complete message, the macro eNB maps a PDCP entity of the DRB to the RLC/MAC entities of the local eNB and releases the original DRB link.

In an implementation, for a DRB in an AM, the macro eNB preserves the SN and all the status variables and maintains all the states and algorithms of encryption, integrity protection and header compression.

A data packet is transmitted and retransmitted in three schemes: 1) all the subsequent data packets are retransmitted and transmitted starting with a first PDCP SDU which has not been acknowledged by an underlying layer; or 2) only PDCP SDUs which have not been acknowledged by the underlying layer and PDCP SDUs which have not been subsequently transmitted through the underlying layer are retransmitted; or 3) data packets which have not been received by a peering end and all the subsequent new data packets are transmitted dependent upon a PDCP status report.

For a DRB in a UM, the macro eNB preserves the SN and all the status variables, maintains all the states and algorithms of encryption, integrity protection and header compression and retransmits all the subsequent packets starting with a first PDCP SDU which has not been acknowledged by an underlying layer.

After switching, the local eNB can transmit downlink data to the UE over the switched DRB of the user plane.

In a second example, the UE is currently connected with both a macro eNB and a local eNB.

Figure 16:
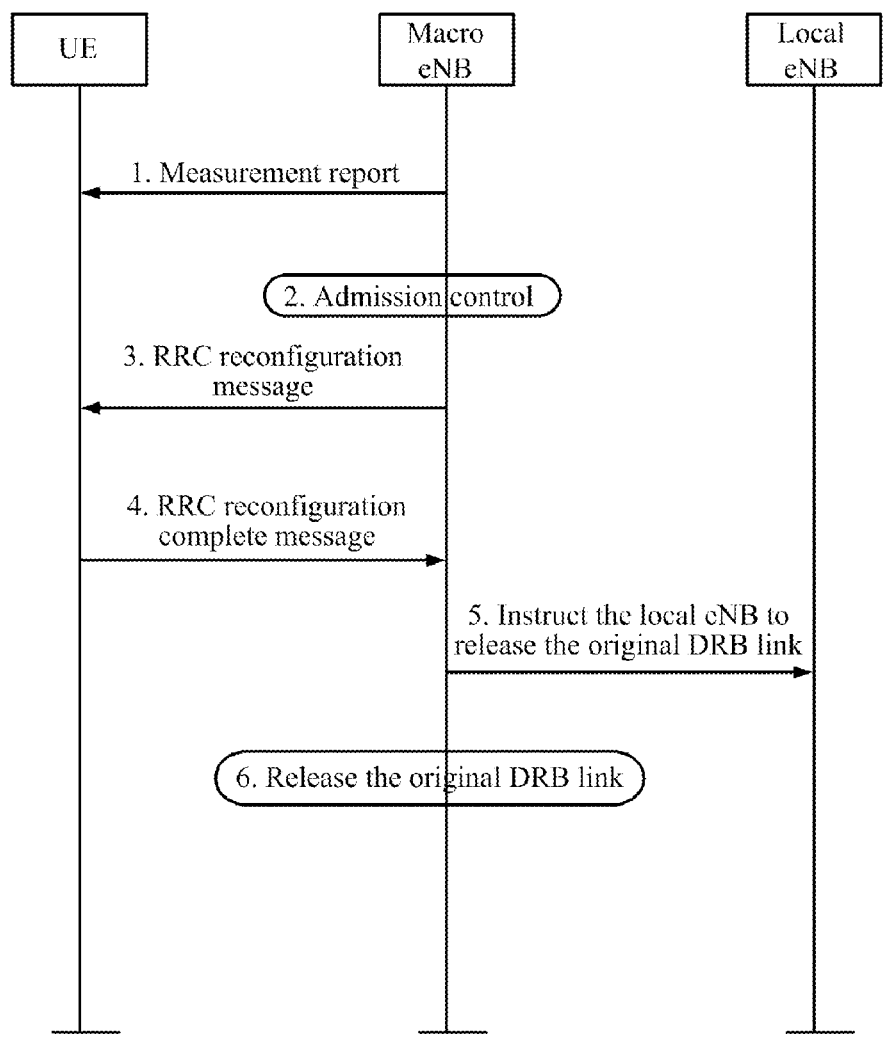
FIG. 16 is a schematic flow chart of a method of switching a control plane bearer from a local cell to a macro cell according to an embodiment of the present invention.

In the case that a DRB is switched from the local eNB to the macro eNB, as illustrated in FIG. 16, a method of switching a control plane bearer from a local cell to a macro cell according to an embodiment of the present invention includes the following operations:

1. The UE reports measurement report information to the macro eNB;

2. The macro eNB decides to reconfigure the DRB and then performs an admission control and configures the new RLC layer, MAC layer and PHY layer;

3. The macro eNB instructs the UE through an RRC reconfiguration message to reconfigure the DRB in the same configuration of the macro eNB;

4. Upon reception of the RRC reconfiguration message, the UE identifies the separation of the control plane from the user plane according to the contents of the message and thereafter activates another set of PHY and MAC entities dedicated to the DRB, sends an RRC reconfiguration complete message to the macro eNB and also reconfigures a new DRB link and releases the original DRB link; and 5. Upon reception of the RRC reconfiguration complete message, the macro eNB maps a PDCP entity of the DRB to the RLC/MAC entities of the local eNB and also instructs the local eNB to release the original DRB link.

6. The local eNB releases the original DRB link.

In an implementation, for a DRB in an AM, the macro eNB preserves the SN and all the status variables and maintains all the states and algorithms of encryption, integrity protection and header compression.

A data packet is transmitted and retransmitted in three schemes: 1) all the subsequent data packets are retransmitted and transmitted starting with a first PDCP SDU which has not been acknowledged by an underlying layer; or 2) only PDCP SDUs which have not been acknowledged by the underlying layer and PDCP SDUs which have not been subsequently transmitted through the underlying layer are retransmitted; or 3) data packets which have not been received by a peering end and all the subsequent new data packets are transmitted dependent upon a PDCP status report.

For a DRB in a UM, the macro eNB preserves the SN and all the status variables, maintains all the states and algorithms of encryption, integrity protection and header compression and retransmits all the subsequent packets starting with a first PDCP SDU which has not been acknowledged by an underlying layer.

After switching, the local eNB can transmit downlink data to the UE over the switched DRB of the user plane.

In a third example, the UE is currently connected with a macro eNB and one of local eNBs (an SRB being at the macro eNB and a DRB being at the local eNB 2).

Figure 17:
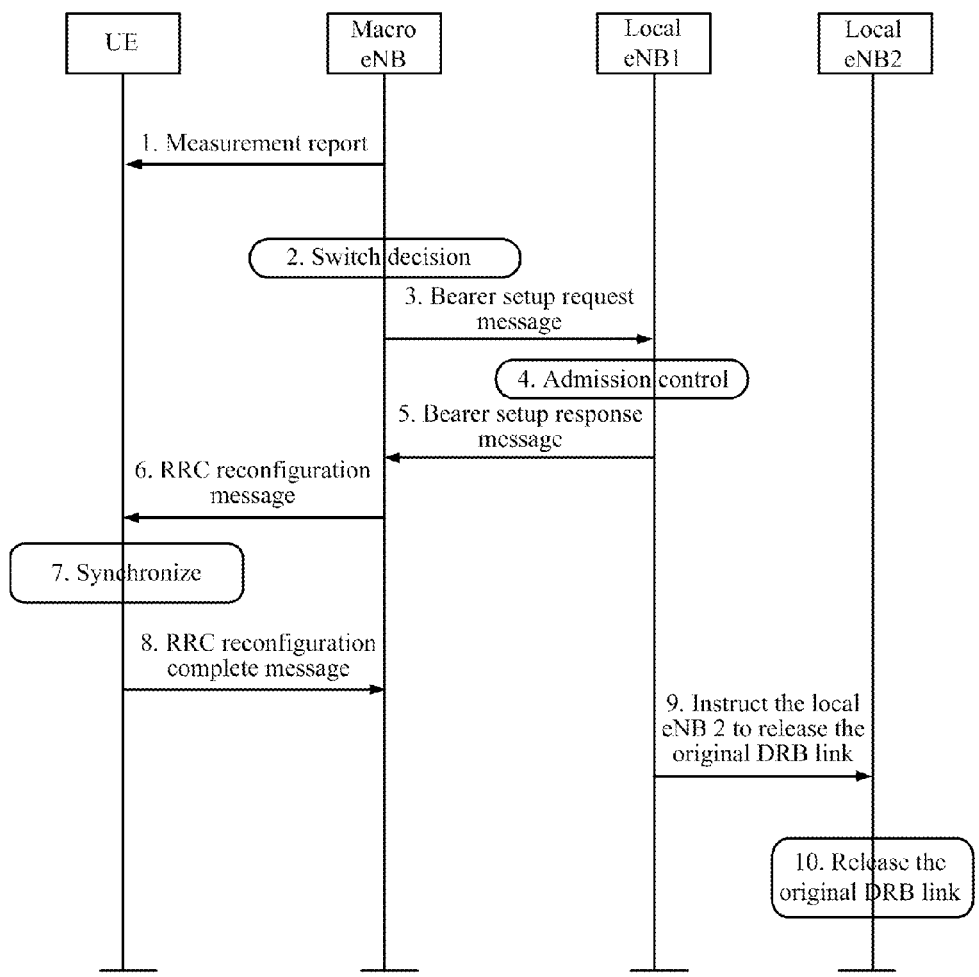
FIG. 17 is a schematic flow chart of a method of switching a control plane bearer from a local cell to a local cell according to an embodiment of the present invention.

In the case that the DRB is switched from the local eNB 2 to the local eNB 1, as illustrated in FIG. 17, a method of switching a control plane bearer from a local cell to a local cell according to an embodiment of the present invention includes the following operations:

1. The UE reports measurement report information to the macro eNB;

2. The macro eNB decides to reconfigure the DRB;

3. The macro eNB transmits a DRB link configuration message to the local eNB 1;

4. The local eNB 1 performs an admission control and then configures the new RLC layer, MAC layer and PHY layer according to parameters in the DRB link configuration message;

5. The local eNB 1 notifies the macro eNB of configuration completion;

6. The macro eNB instructs the UE through an RRC reconfiguration message to reconfigure the DRB;

7. Upon reception of the RRC reconfiguration message, the UE identifies the separation of the control plane from the user plane according to the contents of the message and thereafter activates another set of PHY and MAC entities dedicated to the DRB;

8. The UE is synchronized to a new access point, sends an RRC reconfiguration complete message to the macro eNB and also reconfigures a new DRB link and releases the original DRB link; and 9. Upon reception of the RRC reconfiguration complete message, the macro eNB maps a PDCP entity of the DRB to the RLC/MAC entities of the local eNB and instructs the local eNB 2 releases the original DRB link.

10. The local eNB 2 releases the original DRB link.

The DRB above may be uplink DRB or downlink DRB, alternatively the DRB above may be uplink and downlink DRB.

Those skilled in the art shall appreciate that the embodiments of the present invention can be embodied as a method, a system or a computer program product. Therefore the present invention can be embodied in the form of an all-hardware embodiment, an all-software embodiment or an embodiment of software and hardware in combination. Furthermore the present invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the present invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the present invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the present invention.

Evidently those skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

The invention claimed is:

1. A method of switching, the method comprising:
    receiving, by a user equipment, a Data Radio Bearer, DRB, reconfiguration message from a macro eNB, wherein the DRB reconfiguration message is transmitted by the macro eNB after the macro eNB transmits a bearer setup request message for the user equipment to at least one local eNB; and maintaining, by the user equipment, Packet Data Convergence Protocol, PDCP, layers corresponding to all downlink or/and uplink DRBs of a control plane and a user plane at the macro eNB, and switching other layers than the PDCP layers corresponding to a part or all of the downlink or/and uplink DRBs of the user plane to the at least one local eNB, wherein the DRB reconfiguration message is a Radio Resource Control, RRC, reconfiguration message: and the switching, by the user equipment, the other layers than the PDCP layers corresponding to a part or all of the downlink or/and uplink DRBs of the user plane to at least one local eNB comprises:

configuring, by the user equipment, the other layers than the PDCP layers corresponding to the downlink or/and uplink DRBs of the user plane according to configuration information in the received RRC reconfiguration message:

wherein configuring, by the user equipment, the other layers than the PDCP layers corresponding to the downlink or/and uplink DRBs of the user plane comprises:

configuring, by the user equipment, new Radio Link Control, RLC, entities according to the configuration information in the RRC reconfiguration message, creating a mapping relationship between original PDCP and new RLC entities, activating a set of a Physical, PHY, entity and a Media Access Control, MAC, entity dedicated to the downlink or/and uplink DRB, and being synchronized, through the activated PHY entity and MAC entity, with newly connected local eNB after switching, wherein after the macro eNB transmits the DRB reconfiguration message to the user equipment, the method further comprises:

if the macro eNB is a transmitter of a downlink or/and uplink DRB in an Acknowledgment Mode, AM, or a transmitter of a downlink or/and uplink DRB in a Un-acknowledgment Mode, UM, then Sequence Number, SN, and all status variables are preserved on the macro eNB, and all states and algorithms of encryption, integrity protection and header compression are maintained by the macro eNB.

2. The method according to claim 1, wherein after the user equipment switches the other layers than the PDCP layers corresponding to a part or all of the downlink or/and uplink DRBs of the user plane to at least one eNB, the method further comprises:

sending, by the user equipment, an RRC reconfiguration complete message to the macro eNB.

3. A method of switching, the method comprising:

determining, by a macro eNB, that a user equipment needs to be reconfigured with downlink or/and uplink Data Radio Bearers, DRBs; and transmitting, by the macro eNB, a DRB reconfiguration message to the user equipment to instruct the user equipment to maintain Packet Data Convergence Protocol, PDCP, layers corresponding to all downlink or/and uplink DRBs of a control plane and a user plane at the macro eNB, and switch other layers than the PDCP layers corresponding to a part or all of the downlink or/and uplink DRBs of the user plane to at least one local eNB;

wherein the DRB reconfiguration message is a Radio Resource Control, RRC, reconfiguration message, so that the user equipment which is instructed to switch the other layers than the PDCP layers corresponding to a part or all of the downlink or/and uplink DRBs of the user plane to at least one local eNB is adapted to configure the other layers than the PDCP layers corresponding to the downlink or/and uplink DRBs of the user plane according to configuration information in the RRC reconfiguration message transmitted by the macro eNB, wherein configuring, by the user equipment the other layers than the PDCP layers corresponding to the downlink or/and uplink DRBs of the user plane comprises:

configuring, by the user equipment, new Radio Link Control, RLC, entities according to the configuration information in the RRC reconfiguration message, creating a mapping relationship between original PDCP and new RLC entities, activating a set of a Physical, PHY, entity and a Media Access Control, MAC, entity dedicated to the downlink or/and uplink DRB, and being synchronized, through the activated PHY entity and MAC entity, with newly connected local eNB after switching:

wherein before the macro eNB transmits the DRB reconfiguration message to the user equipment, the method further comprises:

transmitting, by the macro eNB, a bearer setup request message for a user equipment to the at least one local eNB intended to admit the downlink or/and uplink DRBs of the user plane, wherein after the macro eNB transmits the DRB reconfiguration message to the user equipment, the method further comprises:

if the macro eNB is a transmitter of a downlink or/and uplink DRB in an Acknowledgment Mode, AM, or a transmitter of a downlink or/and uplink DRB in a Un-acknowledgment Mode, UM, then Sequence Number, $SN_a$ and all status variables are preserved on the macro eNB, and all states and algorithms of encryption, integrity protection and header compression are maintained by the macro eNB.

4. The method according to claim 3, wherein the switching is performed by separating the other layers than the PDCP layers corresponding to a part or all of the downlink or/and uplink DRBs of the user plane from the control plane, or by transferring the other layers than the PDCP layers corresponding to a part or all of the downlink or/and uplink DRBs of the user plane between local eNBs; and the bearer setup request message comprises Quality of Service, QoS, information of downlink or/and uplink DRBs of each user plane to be switched.

5. The method according to claim 4, wherein before the macro eNB transmits the DRB reconfiguration message to the user equipment, the method further comprises:

receiving, by the macro eNB, a bearer setup request response message from the eNB.

6. The method according to claim 4, wherein after the macro eNB transmits the DRB reconfiguration message to the user equipment, the method further comprises:

for a downlink or/and uplink DRB of the user plane that can be admitted by the eNB, mapping, by the macro eNB, an PDCP entity corresponding to the downlink or/and uplink DRB to the other layers corresponding to the downlink or/and uplink DRB configured by the eNB, upon reception of an RRC reconfiguration complete message from the user equipment.

7. The method according to claim 4, wherein the switching is performed by separating the other layers than the PDCP layers corresponding to a part or all of the downlink or/and uplink DRBs of the user plane from the control plane; and after the macro eNB transmits the DRB reconfiguration message to the user equipment, the method further comprises:

releasing, by the macro eNB, Radio Link Control, RLC, layers of the switched downlink or/and uplink DRBs of the user equipment, and a mapping relationship between the RLC layers and Media Access Control, MAC, and Physical, PHY, layers upon reception of an RRC reconfiguration complete message from the user equipment.

8. The method according to claim 4, wherein the switching is performed by transferring the other layers than the PDCP layers corresponding to a part or all of the downlink or/and uplink DRBs of the user plane between local eNBs; and after the macro eNB transmits the DRB reconfiguration message to the user equipment, the method further comprises:

instructing, by the macro eNB, a specific eNB to release RLC layers of the switched downlink or/and uplink DRBs of the user equipment, and a mapping relationship between the RLC layers and the MAC and PHY layers, upon reception of an RRC reconfiguration complete message from the user equipment;

wherein the specific eNB is such an eNB that number of downlink or/and uplink user plane DRBs of the user equipment is decreased after switching.

9. The method according to claim 3, wherein the switching is performed by converging the other layers than the PDCP layers corresponding to a part or all of the downlink or/and uplink DRBs of the user plane with the control plane; and after the macro eNB transmits the DRB reconfiguration message to the user equipment, the method further comprises:

the macro eNB instructing a specific eNB to release RLC layers of the switched downlink or/and uplink DRBs of the user equipment, and a mapping relationship between the RLC layers and the MAC and PHY layers of the switched downlink or/and uplink DRBs of the user equipment after admitting successfully the user plane of the user equipment;

wherein the specific eNB is such an eNB that number of downlink or/and uplink user plane DRBs of the user equipment is reduced after switching.

10. The method according to claim 3, wherein after the macro eNB transmits the DRB reconfiguration message to the user equipment, the method further comprises:

for a downlink or/and uplink DRB of the user plane in an Acknowledgment Mode, AM, the macro eNB retransmitting starting with a first PDCP Service Data Unit, SDU, which has not been acknowledged by an underlying layer and transmitting all subsequent data packets; or retransmitting only PDCP SDUs which have not been acknowledged by the underlying layer and PDCP SDUs which have not been subsequently transmitted through the underlying layer; or transmitting data packets which have not been received by a peering end and all subsequent new data packets dependent upon a PDCP status report.

11. The method according to claim 3, wherein after the macro eNB transmits the DRB reconfiguration message to the user equipment, the method further comprises:

for a downlink or/and uplink DRB of the user plane in a Un-acknowledgment Mode, UM, retransmitting, by the macro eNB, all subsequent data packets starting with a first PDCP Service Data Unit, SDU, which has not been transmitted through an underlying layer.

12. A method of switching, the method comprising:

receiving, by a local eNB, a bearer setup request message for a user equipment from a macro eNB; and admitting, by the local eNB, other layers than Packet Data Convergence Protocol, PDCP, layers corresponding to a part or all of downlink or/and uplink Data Radio Bearers, DRBs, of a user plane, and being synchronized with a set of a Physical, PHY, entity and a Media Access Control, MAC, entity, dedicated to the downlink or/and uplink DRB, activated by a user equipment switched downlink or/and uplink DRBs: wherein the set of a PHY entity and a MAC entity, dedicated to the downlink or/and uplink DRB is activated by the user equipment during the user equipment configuring the other layers than the PDCP layers corresponding to the downlink or/and uplink DRBs of the user plane according to configuration information in an RRC reconfiguration message received from the macro eNB, wherein configuring, by the user equipment, the other layers than the PDCP layers corresponding to the downlink or/and uplink DRBs of the user plane comprises:

configuring, by the user equipment new Radio Link Control, RLC, entities according to the configuration information in the RRC reconfiguration message, creating a mapping relationship between original PDCP and new RLC entities, activating a set of a Physical, PHY, entity and a Media Access Control, MAC, entity dedicated to the downlink or/and uplink DRB, and being synchronized, through the activated PHY entity and MAC entity, with newly connected local eNB after switching, wherein after the macro eNB transmits the DRB reconfiguration message to the user equipment, the method further comprises:

if the macro eNB is a transmitter of a downlink or/and uplink DRB in an Acknowledgment Mode, AM, or a transmitter of a downlink or/and uplink DRB in a Un-acknowledgment Mode, UM, then Sequence Number, $SN_a$ and all status variables are preserved on the macro eNB, and all states and algorithms of encryption, integrity protection and header compression are maintained by the macro eNB.

13. The method according to claim 12, wherein admitting, by the local eNB, the other layers than the PDCP layers corresponding to a part or all of the downlink or/and uplink DRBs of the user plane comprises:

configuring, by the local eNB, the other layers than the PDCP layers corresponding to the downlink or/and uplink DRBs of the user plane to be admitted according to Quality of Service, QoS, information, of downlink or/and uplink DRBs of each user plane to be switched, included in the bearer setup request message.

14. The method according to claim 12, wherein after the local eNB admits the other layers than the PDCP layers corresponding to a part or all of the downlink or/and uplink DRBs of the user plane, the method further comprises:

sending, by the local eNB, a bearer setup request response message to the macro eNB.

15. The method according to claim 12, wherein the method further comprises:

releasing, by the local eNB, RLC layers of switched downlink or/and uplink DRBs of the user equipment, and a mapping relationship between the RLC layers and the MAC and PHY layers, upon reception of an instruction from the macro eNB to release other entities corresponding to the switched downlink or/and uplink DRBs of the user plane.

* * * * *